(12) United States Patent
Moore

(10) Patent No.: US 10,562,165 B2
(45) Date of Patent: Feb. 18, 2020

(54) HYDRAULIC HAMMER

(71) Applicant: Caterpillar Inc., Peoria, IL (US)

(72) Inventor: Cody T. Moore, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 836 days.

(21) Appl. No.: 15/095,104

(22) Filed: Apr. 10, 2016

(65) Prior Publication Data

US 2016/0221170 A1    Aug. 4, 2016

(51) Int. Cl.
*B25D 9/14* (2006.01)

(52) U.S. Cl.
CPC ................... *B25D 9/145* (2013.01)

(58) Field of Classification Search
CPC . B25D 9/12; B25D 9/145; B25D 9/14; B25D 9/18; B25D 9/26; F16K 17/04; F16K 17/0473; F16K 17/30; F16K 17/34
See application file for complete search history.

(56) References Cited

U.S. PATENT DOCUMENTS

| | | |
|---|---|---|
| 4,012,909 A | 3/1977 | Hibbard |
| 4,102,408 A | 7/1978 | Ludvigson |
| 4,676,323 A * | 6/1987 | Henriksson ............ B25D 9/12 138/30 |
| 4,763,754 A | 8/1988 | Coppolani et al. |
| 4,825,960 A | 5/1989 | Krone |
| 4,945,998 A * | 8/1990 | Yamanaka ............ B25D 9/145 173/207 |
| 5,060,734 A * | 10/1991 | Anderson ............ B25D 9/145 173/128 |
| 5,277,264 A * | 1/1994 | Song ..................... B25D 9/12 175/296 |
| 5,884,713 A * | 3/1999 | Shinohara ............ B06B 1/183 173/206 |
| 5,890,548 A | 4/1999 | Juvonen |
| 6,056,070 A * | 5/2000 | Shinohara ............ B25D 9/145 173/128 |
| 6,371,222 B1 * | 4/2002 | Andersson ............ B25D 9/145 173/136 |

(Continued)

FOREIGN PATENT DOCUMENTS

WO    1995016549    6/1995

*Primary Examiner* — Alexander M Valvis
*Assistant Examiner* — Daniel Jeremy Leeds
(74) *Attorney, Agent, or Firm* — Hibshman Claim Construction PLLC

(57) ABSTRACT

A hydraulic hammer for a machine is provided. The hydraulic hammer includes a housing and a piston disposed within the housing and adapted to reciprocate along a longitudinal axis of the housing. The hydraulic hammer further includes a first chamber and a second chamber defined within the housing. The hydraulic hammer further includes a primary passage extending from an inlet and branching into a first passage and a second passage. The first passage fluidly communicates the primary passage with the first chamber and the second passage fluidly communicates the primary passage with the second chamber. The hydraulic hammer further includes a flow control device coupled to the first passage. The flow control device includes a valve element adapted to move between a first position and a second position based on an input signal indicative of a pressure of charge in the first chamber.

11 Claims, 5 Drawing Sheets

(56) References Cited

U.S. PATENT DOCUMENTS

| | | | | |
|---|---|---|---|---|
| 7,779,930 B2* | 8/2010 | Lohmann | ............... | B25D 9/265 |
| | | | | 173/115 |
| 9,308,635 B2* | 4/2016 | Moore | ................... | B25D 9/145 |
| 2004/0009080 A1* | 1/2004 | Davis | ...................... | F04B 49/24 |
| | | | | 417/454 |
| 2007/0079697 A1* | 4/2007 | Comarmond | ......... | B25D 9/145 |
| | | | | 91/276 |
| 2007/0251731 A1* | 11/2007 | Henriksson | .............. | B25D 9/18 |
| | | | | 175/296 |
| 2009/0090525 A1* | 4/2009 | Juvonen | ................. | B25D 9/145 |
| | | | | 173/1 |
| 2009/0250234 A1* | 10/2009 | Piras | ...................... | B25D 9/145 |
| | | | | 173/207 |
| 2011/0146815 A1* | 6/2011 | Eriksson | ................ | F15B 11/05 |
| | | | | 137/540 |
| 2014/0326473 A1* | 11/2014 | Comarmond | .......... | B25D 9/145 |
| | | | | 173/1 |
| 2015/0000949 A1* | 1/2015 | Moore | ................... | F15B 1/106 |
| | | | | 173/208 |
| 2015/0275474 A1 | 10/2015 | Aracama Martinez De Lahidalga | | |
| 2015/0300219 A1* | 10/2015 | Ono | ......................... | F01M 1/16 |
| | | | | 137/565.13 |
| 2015/0308222 A1* | 10/2015 | Hall | ..................... | E21B 33/035 |
| | | | | 137/538 |
| 2015/0375383 A1* | 12/2015 | Autschbach | ............ | B25D 9/12 |
| | | | | 173/20 |
| 2016/0107302 A1* | 4/2016 | Moore | ................... | B25D 9/145 |
| | | | | 60/415 |
| 2016/0199969 A1* | 7/2016 | Moore | .................... | B25D 9/26 |
| | | | | 173/115 |
| 2017/0312901 A1* | 11/2017 | Comarmond | ............ | B25D 9/26 |

* cited by examiner

HYDRAULIC HAMMER

TECHNICAL FIELD

The present disclosure relates to a machine and more particularly relates to a hydraulic hammer for the machine.

BACKGROUND

Hydraulic hammers are used at work sites to break up large and hard objects before such objects can be moved away. Generally, hydraulic hammers are coupled to a machine, such as excavators or other machines. The hydraulic hammers include a pair of chambers adapted to receive charge and a piston disposed between the pair of chambers to reciprocate along an axis of the hydraulic hammer. In order to facilitate reciprocatory movement of the piston and ensure proper functioning of the hydraulic hammer, each chamber needs to be charged to different pressures. Conventionally, individual charging tools are employed to charge each chamber to a predefined pressure. However, supply of incorrect amount of charge to the chamber may cause performance issues in the hydraulic hammer.

WIPO patent publication number 1995016549, hereinafter referred to as the '549 patent publication, describes an accumulator which is suitable for use with a hydraulic operated rock drill. The hydraulically operated rock drill includes a cylinder, a piston, inside the cylinder, the piston includes an annular formation which moves into and out of a section of reduced dimensions which is connected to the accumulator. The annular formation pressurizes hydraulic fluid in the section whereby hydraulic energy, produced by kinetic energy developed over at least part of a return stroke of the piston, is stored in the accumulator. However, the '549 patent publication fails to provide a manner to control flow of charge to the accumulator.

SUMMARY OF THE DISCLOSURE

In one aspect of the present disclosure, a hydraulic hammer for a machine is provided. The hydraulic hammer includes housing and a piston disposed within the housing. The piston is adapted to reciprocate along a longitudinal axis of the housing. The hydraulic hammer further includes a first chamber and a second chamber defined within the housing. The hydraulic hammer further includes a primary passage extending from an inlet and branching into a first passage and a second passage. The first passage fluidly communicates the primary passage with the first chamber and the second passage fluidly communicates the primary passage with the second chamber. The hydraulic hammer further includes a flow control device coupled to the first passage. The flow control device includes a valve element adapted to move between a first position and a second position based on an input signal indicative of a pressure of charge in the first chamber. The valve element allows flow of charge from the primary passage to the first chamber in the first position and restricts flow of charge from the primary passage to the first chamber in the second position. The valve element allows the first chamber to be pressurized to a first pressure equal to the input signal and the second chamber to be pressurized to a second pressure greater than the first pressure through the inlet.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claim.

Figure 1:
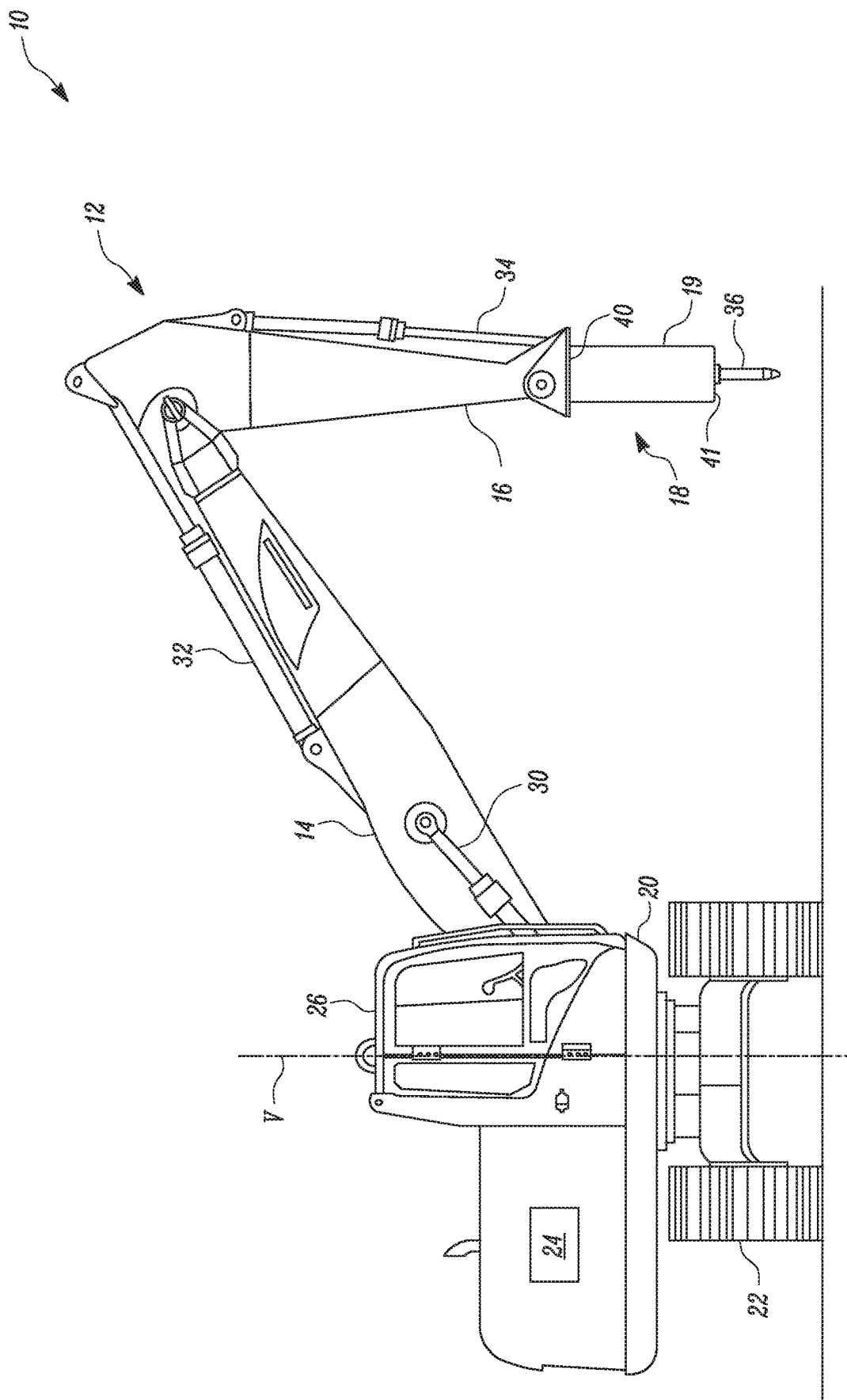
FIG. 1 is a side view of an exemplary machine having a hydraulic hammer, according to an embodiment of the present disclosure.

FIG. 1 illustrates a side view of an exemplary machine 10 equipped with an implement 12. In the illustrated embodiment, the machine 10 is shown as an excavator-type earth-moving machine or logging machine. The machine 10 may be embodied as, but is not limited to, an excavator, a material handler, a long reach excavator, a foundation drill, a rock drill, a piling machine, a tunneling machine, and a front shovel. The implement 12 includes linkages, such as a boom 14, an arm, such as an arm 16, and a hydraulic hammer 18. The boom 14 is pivotally connected to a chassis 20 of the machine 10, the arm 16 is pivotally connected to the boom 14, and the hydraulic hammer 18 is coupled to the arm 16.

The machine 10 includes a drive unit 22, such as tracks, for propelling the machine 10. The machine 10 further includes a power source 24 to power the implement 12 and the drive unit 22, and an operator cabin 26 for hosting user interface devices for controlling the implement 12 and the drive unit 22. The power source 24 may embody an engine, such as a diesel engine, a gasoline engine, a gaseous fuel-powered engine, or any other type of combustion engine known in the art. The power source 24 may alternatively embody a non-combustion source of power, such as a fuel cell, or a power storage device. The power source 24 produces a mechanical or electrical power output that may then be converted to hydraulic power for moving the implement 12 and the hydraulic hammer 18.

Further, a movement of the hydraulic hammer 18 with respect to a work surface is achieved by raising and lowering the boom 14 with respect to the chassis 20, and by moving the arm 16 with respect to the boom 14. Further, the hydraulic hammer 18 may be moved relative to the arm 16. A first hydraulic actuator 30 is actuated to lower and raise the boom 14 with respect the chassis 20. The arm 16 is moved toward and outward with respect to the operator cabin 26 by a second hydraulic actuator 32. A third hydraulic actuator 34 is used to operate the hydraulic hammer 18 relative to the arm 16. Moreover, the chassis 20 and the implement 12 may be rotated about a vertical axis 'V' by a fourth hydraulic actuator (not shown), such as a hydraulic motor, with respect to the drive unit 22. The hydraulic hammer 18 includes a housing member 19. The housing member 19 includes a first end 40 and a second end 41. The first end 40 of the housing member 19 is coupled to the arm 16 of the implement 12. The second end 41 of the housing member 19 receives a work tool 36 that engages with the work surface. The hydraulic hammer 18 includes a power cell 38 (shown in FIG. 2) enclosed within the housing member 19. The power cell 38 actuates the work tool 36 to perform earth moving operations in the work surface.

Figure 2:
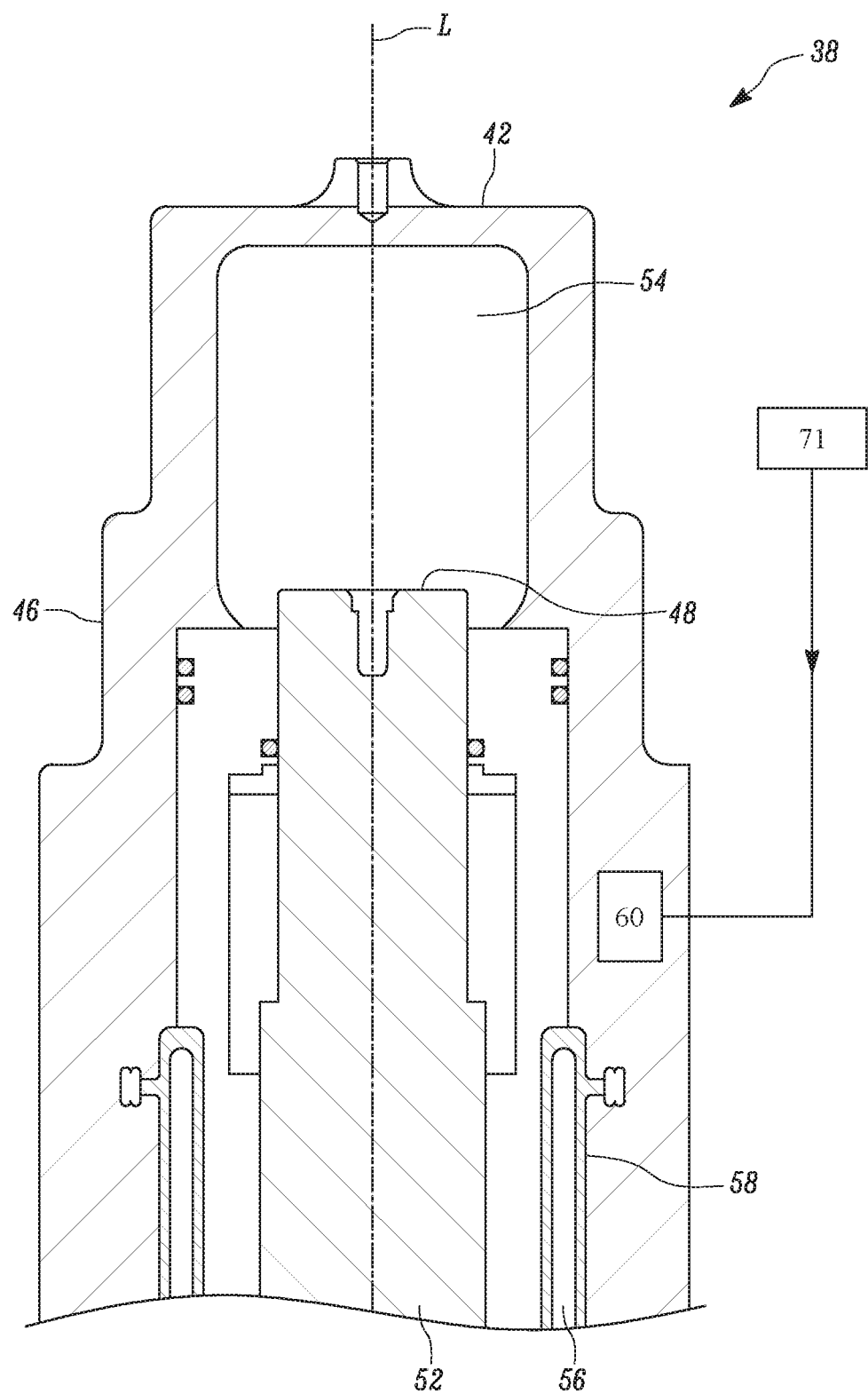
FIG. 2 is a cross-sectional view of a portion of a power cell of hydraulic hammer of FIG. 1.

FIG. 2 illustrates a cross-sectional view of a portion of the power cell 38. The power cell 38 includes a first end 42 and a second end (not shown) disposed within the housing member 19 of the hydraulic hammer 18. The power cell 38 includes a housing 46. The housing 46 defines a hollow space to accommodate multiple components, such as a piston 52 and bearing components therein, to facilitate operation of the hydraulic hammer 18. The piston 52 is coaxially disposed within the housing 46 to reciprocate along a longitudinal axis 'L' of the housing 46.

The hydraulic hammer 18 further includes a first chamber 54 defined in proximity to a first end 48 of the piston 52. The first chamber 54 defines a volume 'V1' which may be varied based on the reciprocating motion of the piston 52. For example, the volume 'V1' of the first chamber 54 increases due to a downward movement of the piston 52 and decreases due to an upward movement of the piston 52. Decrease in the volume 'V1' of the first chamber 54 increases pressure within the first chamber 54. Such increase in pressure facilitates downward movement of the piston 52 during the operation of the hydraulic hammer 18.

The hydraulic hammer 18 further includes a second chamber 56 coaxially disposed around the piston 52. The second chamber 56 is located between the first end 48 and the second end of the piston 52. In an example, the second chamber 56 may extend between the first end 48 and the second end of the piston 52. A sealant 58 disposed around the second chamber 56 prevents escape of charge from the second chamber 56. In an example, the sealant 58 may be an elastomeric material, such as rubber.

For the purpose of charging each of the first chamber 54 and the second chamber 56, a charge plug 60 is deployed in the hydraulic hammer 18. For example, the charge plug 60 is embedded into the housing 46 of the hydraulic hammer 18. The charge plug 60 receives charge from a reservoir 71 and supply the charge to the first chamber 54 and the second chamber 56. The first chamber 54 receives a first predetermined volume of charge and the second chamber 56 receives a second predetermined volume of charge. The first predetermined volume of charge and the second predetermined volume of charge causes the first chamber 54 to achieve a first pressure 'P1' and the second chamber 56 to achieve a second pressure 'P2', respectively. The term 'charge' may be understood as a fluid, such as nitrogen.

Figure 3:
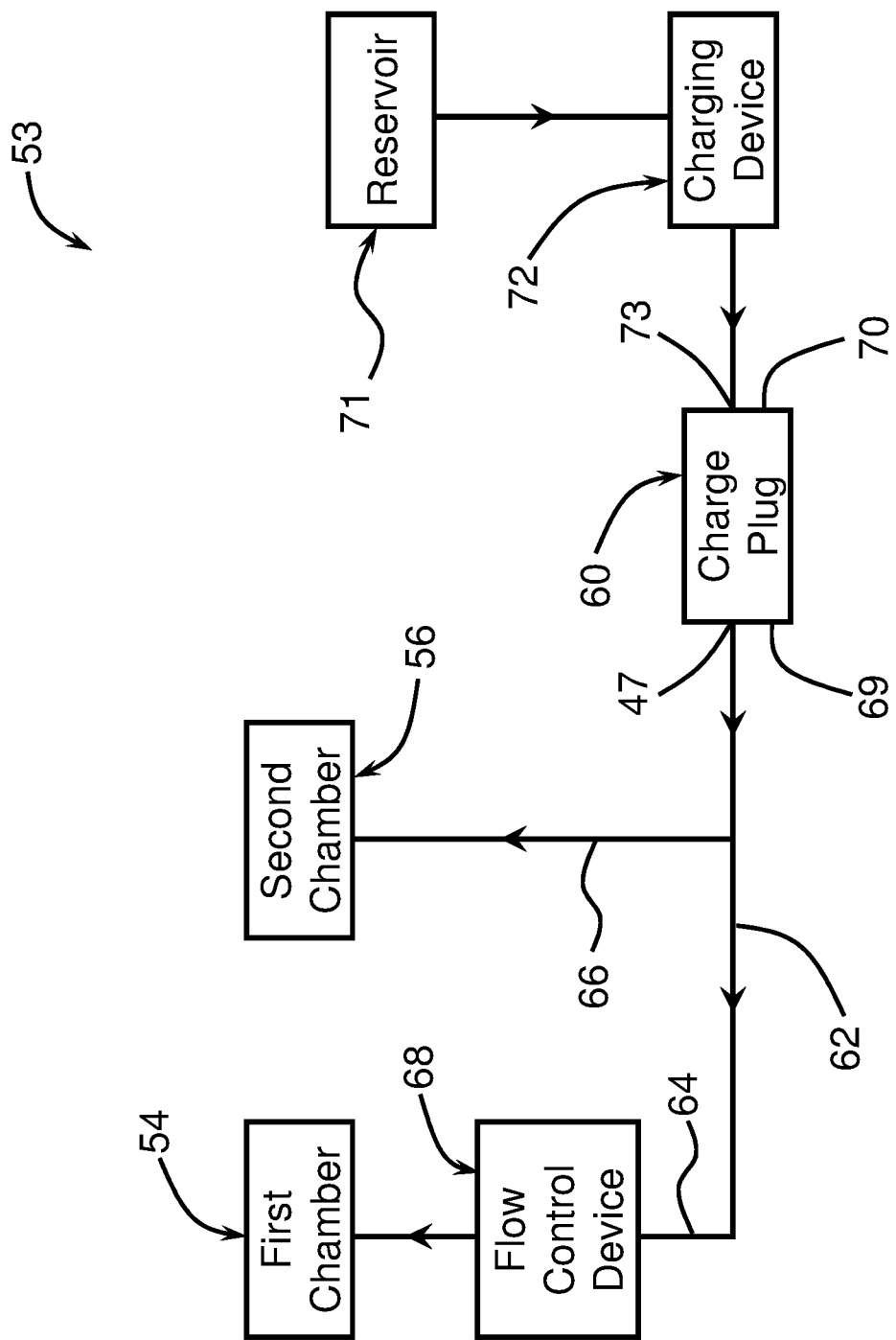
FIG. 3 is a block diagram of a charging system of the hydraulic hammer having a flow control device.

FIG. 3 illustrates a block diagram of a charging system 53 associated with the power cell 38 of the hydraulic hammer 18. A primary passage 62 is provided in the housing 46 of the power cell 38 to interconnect the first chamber 54 and the second chamber 56. In an example, the primary passage 62 may be a conduit that aids in fluid communication with each of the first chamber 54 and the second chamber 56. The primary passage 62 extends from an inlet 47 provided in the housing 46. The inlet 47 may be understood as an opening or a port provided in the housing 46 for allowing entry of charge into the primary passage 62, for operating the hydraulic hammer 18.

The primary passage 62 further branches into a first passage 64 and a second passage 66. The first passage 64 allows fluid communication between the primary passage 62 and the first chamber 54. The second passage 66 allows fluidic communication between the primary passage 62 and the second chamber 56. In an example, the first passage 64 and the second passage 66 may be conduits that aids in the fluid communication.

The hydraulic hammer 18 further includes a flow control device 68 as a part of the charging system 53. The flow control device 68 is coupled to the first passage 64. The flow control device 68 controls flow of the charge supplied to the first chamber 54 from the charge plug 60 via the primary passage 62. In an example, the flow control device 68 may be a flow control valve or an electro hydraulic valve. The flow control device 68 is adapted to maintain the first chamber 54 at the first pressure 'P1'.

Further, the charge plug 60 deployed in the hydraulic hammer 18 includes a first end 69 and a second end 70. The charge plug 60 is adapted to receive the charge from a charging device 72 and supply the charge to the primary passage 62. For the purpose of illustration, the first end 69 of the charge plug 60 is adapted to fluidly communicate with the inlet 47 of the primary passage 62. The second end 70 of the charge plug 60 includes a connecting port 73 to fluidly communicate with the charging device 72. In an example, the charging device 72 may be a motor and pump arrangement to pump the charge from the reservoir 71 to the charge plug 60. Owing to the branching of the primary passage 62, the charge supplied by the charge plug 60 flows to the first chamber 54 and the second chamber 56 via the first passage 64 and the second passage 66, respectively. It will be understood that the charge flowing to the first chamber 54, flows through the flow control device 68 disposed along the first passage 64.

Figure 4:
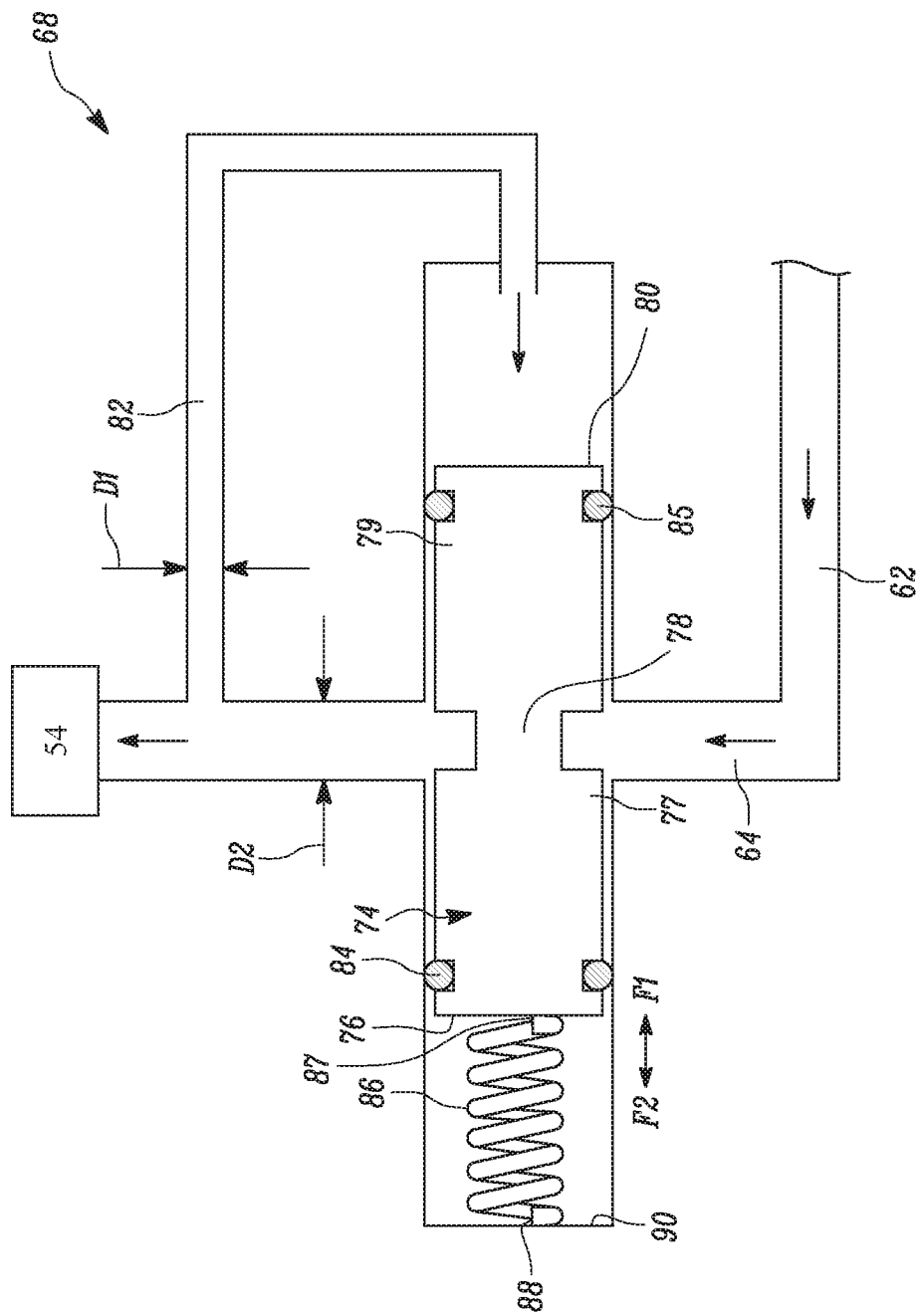
FIG. 4 is a schematic diagram showing a first position of a valve element of the flow control device of FIG. 3.

FIG. 4 illustrates a schematic diagram showing a first position 'F1' of a valve element 74 of the flow control device 68. The flow control device 68 controls the flow of the charge to the first chamber 54. The flow control device 68 includes the valve element 74 slidably disposed therein. The valve element 74 has a first end 76 and a second end 80. For the purpose of description, the valve element 74 is considered to include a first portion 77, a second portion 78, and a third portion 79. In an example, the valve element 74 may be embodied as a cylinder. A cross-sectional area of the second portion 78 is less than cross-sectional area of each of the first portion 77 and the third portion 79. As such, the second portion 78 defines a region of constriction between the first portion 77 and the third portion 79 of the valve element 74. Further, the valve element 74 includes a first sealing member 84 disposed on the first portion 77 and a second sealing member 85 disposed on the third portion 79 of the valve element 74. In an example, the first sealing member 84 and the second sealing member 85 may be made of elastomeric material, such as rubber. In an example, the first sealing member 84 and the second sealing member 85 may be disposed in contact with an inner surface of the flow control device 68. In such an arrangement, the first sealing member 84 and the second sealing member 85 prevents charge from flowing across the valve element 74. Further, the valve element 74 is adapted to move between the first position 'F1' and a second position 'F2'. The first sealing member 84 and the second sealing member 85, in addition, assists in smooth movement of the valve element 74.

The flow control device 68 further includes a resilient member 86 having a first end 87 and a second end 88. The first end 87 of the resilient member 86 is attached to the first end 76 of the valve element 74 and the second end 88 is attached to a rigid surface 90 within the flow control device 68, as shown in FIG. 4. By virtue of resilience, the resilient member 86 is actuated between a free length condition (shown in FIG. 4) to a compressed condition (shown in FIG. 5). Such actuation of the resilient member 86 assists in movement of the valve element 74 between the first position 'F1' and the second position 'F2'.

Further, the first passage 64 branches into a control passage 82 at a position downstream of the flow control device 68. In an example, a cross-sectional diameter 'D1' of the control passage 82 is less than a cross-sectional diameter 'D2' of the first passage 64. During charging of the hydraulic hammer 18, the charge supplied to the primary passage 62 flows to the first chamber 54 via the first passage 64. Since the supplied charge occupies the first chamber 54 until the volume 'V1' is reached, charge flowing through the control passage 82 is minimum. Further, the control passage 82 is in fluidic communication with the second end 80 of the valve element 74. Owing to such minimum amount of charge flowing through the control passage 82 and cross-sectional diameter 'D1', the charge exiting the control passage 82 is associated with minimum pressure. In addition, a force corresponding to such minimum pressure remains to be less than a biasing force of the resilient member 86. As such, the valve element 74 remains to be in the first position 'F1', as shown in FIG. 4. The second portion 78 of the valve element 74 is aligned with the first passage 64 in the first position 'F1' of the valve element 74. Due to constricted region of the second portion 78, the valve element 74 allows flow of charge from the primary passage 62 to the first chamber 54 in the first position 'F1'.

Figure 5:
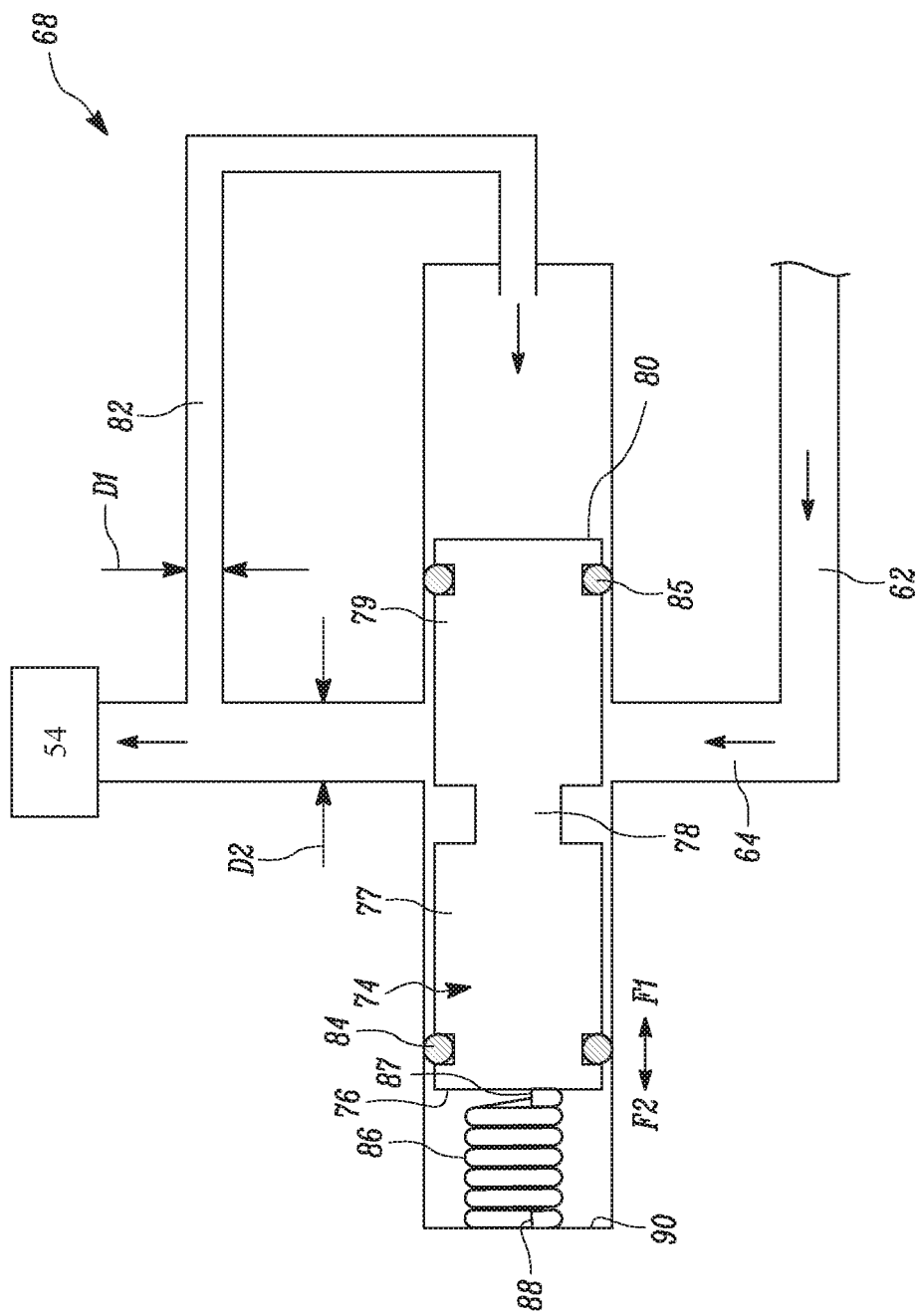
FIG. 5 is a schematic diagram showing a second position of a valve element of the flow control device of FIG. 3.

Once the first chamber 54 receives a predetermined volume of charge and achieves the first pressure 'P1', the charge further being supplied to the first chamber 54 accumulates within the first passage 64. Since the first passage 64 branches into the control passage 82, subsequent charge flowing into the first passage 64 is directed into the control passage 82. For the purpose of description, the charge flowing through the control passage 82 is referred to as an input signal. Further, the input signal is indicative of pressure of charge in the first chamber 54. Alternatively, the input signal may indicate that the first chamber 54 has achieved the first pressure 'P1'. Furthermore, the charge exiting the control passage 82 impinges on the second end 80 of the valve element 74. When a force associated with the pressure of the charge exiting the control passage 82 is greater than the biasing force of the resilient member 86, the valve element 74 is forced to move to the second position 'F2' towards the rigid surface 90, as shown in FIG. 5. Such movement of the valve element 74 actuates the resilient member 86 to the compressed condition. In addition, due to the movement of the valve element 74 to the second position 'F2', the third portion 79 of the valve element 74 is aligned with the first passage 64. As such, the valve element 74 restricts flow of charge from the primary passage 62 to the first chamber 54 in the second position 'F2'.

Although the present disclosure describes the input signal indicative of pressure of charge in the first chamber 54, it should be understood that such embodiment is for the purpose of description and should not be construed as limitation. It will be understood that other methods may be employed by a person skilled in the art, albeit with few variations to the arrangement described herein. For example, multiple pressure sensors may be deployed in the first chamber 54 to sense pressure in the first chamber 54. The multiple pressure sensors may be configured to generate the input signal indicative of the pressure in the first chamber 54. Further, a controller may be coupled to the pressure sensors and may be configured to actuate movement of the valve element 74 when the first chamber 54 achieves the first pressure 'P1'. Furthermore, in another example, the valve element 74 may be solenoid actuated valve. In such cases, the controller may energize a solenoid and may cause movement of the solenoid actuated valve between the first position 'F1' and the second position 'F2'. In yet another example, the valve element 74 may be actuated hydraulically, instead of pneumatic pressure. Furthermore, although the description herein describes the first chamber 54, the second chamber 56, the primary passage 62, and the flow control device 68 as a part of the hydraulic hammer 18, it will be understood that these elements may be formed as parts of the power cell 38.

Various embodiments disclosed herein are to be taken in the illustrative and explanatory sense, and should in no way be construed as limiting of the present disclosure.

INDUSTRIAL APPLICABILITY

The present disclosure provides the hydraulic hammer 18 for the machine 10. The primary passage 62, the first passage 64, the second passage 66, and the charge plug 60 assist in simultaneous charging of the first chamber 54 and the second chamber 56. As such, requirement of separate charge plugs 60 for charging the first chamber 54 and the second chamber 56 is overcome. In addition, cost of charging the hydraulic hammer 18 is minimized, which was otherwise higher due to the requirement of separate charge plugs. Further, since the valve element 74 of the flow control device 68 is actuated based on the input signal, the first chamber 54 is efficiently charged to the required pressure. The actuation of the valve element 74 to the second position 'F2', based on the input signal, restricts further flow of charge to the first chamber 54. As such, the actuation of the valve element 74 allows the second chamber 56 to be pressurized, through the inlet 47, to the second pressure 'P2' greater than the first pressure 'P1'. In addition, the flow control device 68 is embedded into the housing 46 of the hydraulic hammer 18, thereby enabling better packaging of the hydraulic hammer 18.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic hammer for a machine, the hydraulic hammer comprising:
   a housing;
   a piston disposed within the housing and adapted to reciprocate along a longitudinal axis of the housing;
   a first chamber defined within the housing;
   a second chamber defined within the housing;
   a primary passage extending from an inlet and branching into a first passage and a second passage, the first chamber being fluidly coupled to the primary passage via the first passage, the second chamber being fluidly coupled to the primary passage along a flow path that includes the second passage but does not include the first chamber;

a flow control device included along the first passage such that the first chamber is fluidly coupled to the primary passage via the flow control device, the flow control device including a valve element adapted to move between a first position and a second position based on an input signal that is indicative of a pressure of charge in the first chamber;

a control passage that effects fluid communication between the first chamber and an end of the valve element to convey the fluid signal to the valve element; and a sealing member disposed around the valve element to block fluid communication between the end of the valve element and the first passage along a periphery of the valve element, wherein the first position of the valve element allows a flow of charge from the primary passage to the first chamber, wherein a flow restriction on the first passage effected by the second position of the valve element is greater than a flow restriction of the first passage effected by the first position of the valve element, wherein the pressure of charge in the first chamber acts to bias the valve element toward the second position, wherein the input signal is a fluid signal, and wherein the control passage extends from a branch connection with the first passage to the end of the valve element, the branch connection with the first passage being disposed between the valve element and the first chamber along a flow direction from the valve element toward the first chamber.

2. The hydraulic hammer of claim 1, wherein the first chamber is proximal to a first end of the piston.

3. The hydraulic hammer of claim 2, wherein the second chamber is defined between the first end and a second end of the piston, and disposed coaxially around the piston, wherein the second end of the piston is adapted to engage with a work tool of the hydraulic hammer.

4. The hydraulic hammer of claim 1, further comprising a charge plug adapted to receive a charge from a charging device and supply the charge to the primary passage, the charge plug having a first end that is fluidly coupled to the inlet of the primary passage, and a second end that includes a connecting port to fluidly communicate with the charging device.

5. The hydraulic hammer of claim 1, wherein the valve element includes a first portion and a second portion,
the first portion defines a constriction relative to the second portion,
the first portion of the valve element is aligned with the first passage when the valve element is located in the first position, and
the second portion of the valve element is aligned with the first passage when the valve element is located in the second position.

6. The hydraulic hammer of claim 5, further comprising a resilient member that biases the valve element toward the first position.

7. The hydraulic hammer of claim 6, wherein the valve element further includes a third portion, the first portion of the valve element being disposed between the second portion and the third portion of the valve element, and
the resilient member bears upon the third portion of the valve element.

8. A machine, comprising:
a chassis; and
an implement operatively coupled to the chassis, the implement including a hydraulic hammer, the hydraulic hammer comprising:
a housing;
a piston disposed within the housing and adapted to reciprocate along a longitudinal axis of the housing;
a first chamber defined within the housing;
a second chamber defined within the housing;
a primary passage extending from an inlet and branching into a first passage and a second passage, the first chamber being fluidly coupled to the primary passage via the first passage, the second chamber being fluidly coupled to the primary passage along a flow path that includes the second passage but does not include the first chamber;
a flow control device included along the first passage such that the first chamber is fluidly coupled to the primary passage via the flow control device,
the flow control device including a valve element adapted to move between a first position and a second position based on an input signal that is indicative of a pressure of charge in the first chamber;
a control passage that effects fluid communication between the first chamber and an end of the valve element to convey the fluid signal to the valve element; and
a sealing member disposed around the valve element to block fluid communication between the end of the valve element and the first passage along a periphery of the valve element,
wherein the first position of the valve element allows a flow of charge from the primary passage to the first chamber,
wherein a flow restriction on the first passage effected by the second position of the valve element is greater than a flow restriction of the first passage effected by the first position of the valve element,
wherein the pressure of charge in the first chamber acts to bias the valve element toward the second position
wherein the input signal is a fluid signal, and
wherein the control passage extends from a branch connection with the first passage to the end of the valve element, the branch connection with the first passage being disposed between the valve element and the first chamber along a flow direction from the valve element toward the first chamber.

9. The machine of claim 8, wherein the valve element includes a first portion and a second portion,
the first portion defines a constriction relative to the second portion,
the first portion of the valve element is aligned with the first passage when the valve element is located in the first position, and
the second portion of the valve element is aligned with the first passage when the valve element is located in the second position.

10. The machine of claim 9, further comprising a resilient member that biases the valve element toward the first position.

11. The machine of claim 10, wherein the valve element further includes a third portion, the first portion of the valve element being disposed between the second portion and the third portion of the valve element, and the resilient member bears upon the third portion of the valve element.

\* \* \* \* \*